(No Model.)

I. A. STEWART.
SAFETY DRIVING REIN HITCH FOR VEHICLES.

No. 539,654. Patented May 21, 1895.

WITNESSES:
Jos. A. Ryan
Amre N. Hart

INVENTOR
Isaac A. Stewart,
BY Munn & Co.
ATTORNEYS.

UNITED STATES PATENT OFFICE.

ISAAC A. STEWART, OF DE LAND, FLORIDA.

SAFETY DRIVING-REIN HITCH FOR VEHICLES.

SPECIFICATION forming part of Letters Patent No. 539,654, dated May 21, 1895.

Application filed March 1, 1895. Serial No. 540,182. (No model.)

*To all whom it may concern:*

Be it known that I, ISAAC A. STEWART, of De Land, in the county of Volusia and State of Florida, have invented a new and Improved Safety Driving-Rein Hitch for Vehicles, of which the following is a specification.

The object of my invention is to provide an improved attachment for buggies, carriages, wagons, carts, &c., which are drawn by horses or mules. It is adapted for connecting the driving reins with one of the wheels of the vehicle, for the purpose of holding the horse or other animal attached to the vehicle, when the driver is absent. The chief feature of the attachment is a rotatable roller, or drum, having a retracting spring, and two cords, or equivalents, which are wound on the roller in opposite directions, so that, when either is pulled and drawn off, the other is wound on, the roller. The said cords are each provided with a hook or clamp, one for connecting with the driving reins, and the other with a wheel of the vehicle. The roller is journaled in a suitable holder, preferably in a box, or casing, adapted for attachment to the body of the vehicle, and the cords or wires run through suitable guides. When the cords are properly connected with the driving reins and a vehicle wheel, respectively, if the horse moves, a gradually-increasing tension is applied to the cords, by reason of the rotation of the wheel, thus quickly checking the animal; and, if he backs, as he will normally tend to do, the tension on the reins is relaxed, since the spring connected with the roller then rotates in the reverse direction.

Figure 1:
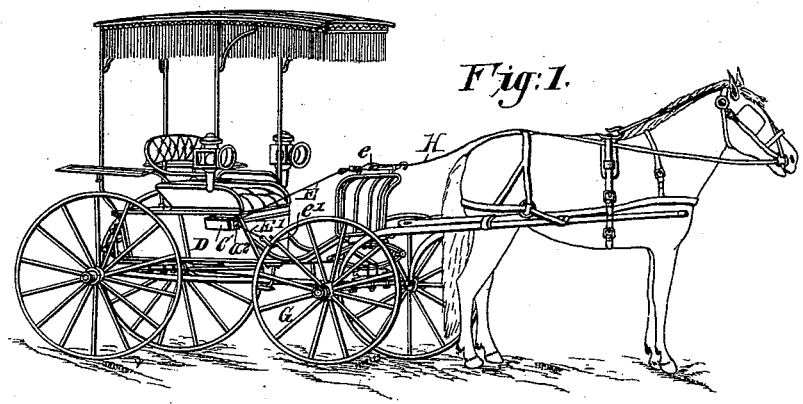
Figure 2:
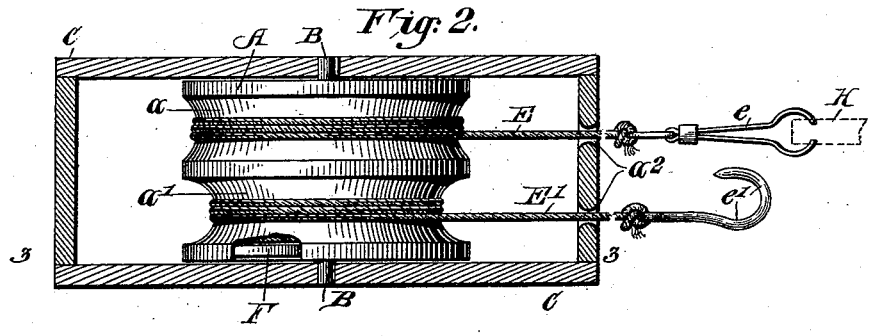

In the accompanying drawings, Figure 1 is a perspective view showing my invention applied to a carriage as in practical use. Fig. 2 is a central longitudinal section of the box or casing of the apparatus, and Fig. 3 is a longitudinal section on line 3 3 of Fig. 2.

In Fig. 1, my device or apparatus is shown attached to the outer, "near" side of a driving-wagon body, just below the seat thereof, and the ends of the respective cords are connected with the driving reins and the adjacent front wheel.

Figure 3:
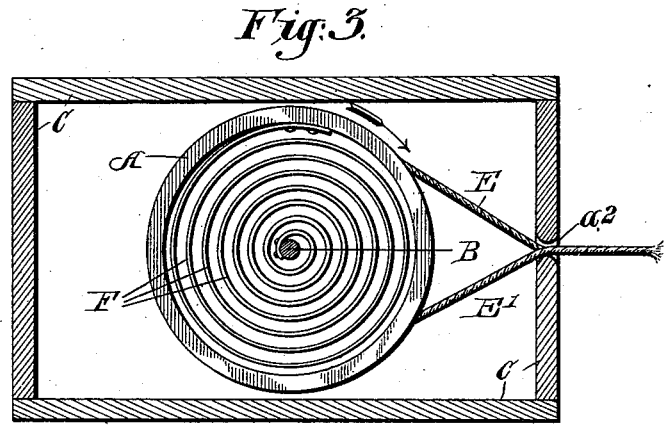

As shown in Figs. 2 and 3, the roller or drum, A, is mounted rotatably on a shaft or axle, B, fixed transversely in an oblong, rectangular box, or casing, C, provided with a cover, and secured to the wagon body D. It may be arranged at various points on the body, inside or outside, but it is preferably located as shown in Fig. 1.

The roller, A, is provided with two parallel, circumferential grooves, $a$, $a'$, and the two cords E, E', are secured in the respective grooves, and wound in opposite, or reverse, directions. From the roller, the cords pass through guides, $a^2$, which are preferably holes formed in the forward end of the casing A. The guides serve to direct the cords so that they wind straight on the roller and are thus kept in the grooves. By preference, the groove, $a'$, in which the lower cord, E', winds, is made deeper than the other one, $a$, so that a slight movement of the wheel, G, will exert a stronger pull on the reins than if both grooves were of equal depth.

One end of the roller, A, is recessed (Fig. 3), to receive a coiled spring, F, whose respective ends are attached to the axle and roller, as shown. The axle being fixed, so that it can not rotate, it is apparent that, if the roller be rotated from its normal position, the spring will tend to rotate it back to such position.

The lower cord, E', is provided at its outer end with a hook, $e'$, adapted to engage a spoke of the vehicle wheel, G, and the other cord, E, is provided with a clamp, $e$, which is adapted to hold the driving reins, H, tightly.

The operation of the apparatus is readily understood. When the driver desires to leave the vehicle, he secures the lower cord, E', to a spoke of the front wheel, G, and the other to the driving-reins, H—it being understood the latter are to be drawn taut, and the slack of each cord taken up without rotating the roller, A, out of its normal position. If now the animal moves forward, the rotation of the wheel, will exert traction on the lower cord, E', and rotate the roller, A, in direction of the arrow, Fig. 2, so that the upper cord, E, is taken up and the reins pulled correspondingly, thus causing the animal to stop. In consequence of the pressure thus applied to the bit, he will tend to step backward, which will obviously be effective, since it will cause the wheel to rotate backward, thereby slackening the lower cord, E', and allowing the roller to rotate back to its normal position, and, in so doing, pay out the upper cord, E, and slacken the reins so that the pressure on the animal's mouth is relieved.

I do not propose to restrict myself to the precise details of construction shown, since it is obvious they may be varied within certain limits without departing from the principle of the invention.

What I claim is—

1. The improved safety-rein hitch, comprising a casing or holder adapted for attachment to a vehicle body, a roller fixed in said holder, a retracting spring connected with the roller, two cords attached to and wound on the roller in reverse directions, and extended as shown, for connection with the driving reins and a vehicle wheel, and devices secured to the rope ends for connecting them to the wheel and driving reins, respectively as specified.

2. The improved safety rein hitch, comprising a box, or casing, having cord guides, a roller mounted rotatably on an axle fixed in said casing, and having a recess in one end, a coiled spring arranged in such recess, and attached at its respective ends to the roller and its fixed axis, and two cords passing through the said guides and attached to the periphery of the roller and wound in reverse directions thereon, and devices secured to the free ends of the cords for connecting them detachably with the driving reins and vehicle wheel, as shown and described.

3. The improved safety rein hitch, comprising a casing adapted for fixed attachment to a vehicle body, a roller mounted rotatably in said casing and having two parallel peripheral grooves, one deeper than the other, two cords fastened in the respective grooves and wound in reverse directions, guides through which the cords pass, devices secured to the free ends of the cords, for detachable connection with the driving reins and a vehicle wheel, and a retracting spring arranged in a cavity in the end of the roller and secured at its respective ends to the roller and its fixed axis, as shown and described.

ISAAC A. STEWART.

Witnesses:
GRAU BLY,
EGFORD BLY.